Patented Oct. 19, 1954

2,692,257

UNITED STATES PATENT OFFICE 2,692,257

ETHYLENE POLYMERIZATION WITH CONDITIONED ALUMINA-MOLYBDENA CATALYSTS

Alex Zletz, Park Forest, Ill., assignor to Standard Oil Company, Chicago, Ill., a corporation of Indiana No Drawing. Application April 28, 1951,
Serial No. 223,641

22 Claims. (Cl. 260—88.1)

This invention relates to a novel polymerization process and to novel polymerization products produced thereby. In a more specific aspect, this invention relates to a novel process for the polymerization of ethylene.

One object of my invention is to provide novel and highly useful catalysts for the preparation of high molecular weight polymers from ethylene-containing gas mixtures. Another object is to provide a novel process for the polymerization of ethylene to high molecular weight normally solid polymers. Still another object of my invention is to provide a novel process for the conversion of gas mixtures comprising essentially ethylene to high molecular weight solid resinous or plastic materials. An additional object is to provide a method for the manufacture of novel and unusual homopolymers from ethylene having specific viscosities ($\times 10^5$) in excess of about 100,000 or even in excess of 300,000, said homopolymers being characterized by their minimal solubility in boiling aromatic solvents. Still another object is to provide new ethylene homopolymers having extremely high molecular weights and related physical and mechanical properties heretofore unattained in the art.

A further object is to provide a relatively low temperature, low pressure process for the conversion of ethylene-containing gases to high molecular weight resinous or plastic materials. An additional object of the present invention is to provide a process for the co-polymerization of ethylene with other polymerizable materials, particularly with a normally gaseous mono-olefin such as propylene. Yet another object is to provide novel methods for the regeneration of solid catalysts employed for the conversion of ethylene-containing gas streams to high molecular weight solid materials. These and other objects of my invention will become apparent from the ensuing description thereof.

Briefly, the inventive process comprises the conversion of ethylene to high molecular weight normally solid polymers by contact with a catalyst comprising essentially a reduced molybdenum oxide combined with an activated adsorptive alumina of the type of gamma-alumina. The inventive process is effected at temperatures between about 75° C. and about 325° C., preferably between about 130° C. and 260° C., and pressures between about atmospheric and 5000 p. s. i. g. or higher, preferably between about 200 and 2000 or about 1000 p. s. i. g. The normally solid materials produced by the catalytic conversion tend to accumulate upon and within the solid catalyst. The rate of ethylene conversion and the extent of removal of solid polymeric conversion products from the catalyst can both be favorably influenced by maintaining the catalyst, during ethylene conversion, in contact with a liquid medium which serves both as a reaction medium and a solvent for the solid reaction products. Suitable liquid reaction media include various hydrocarbons, particularly an aromatic hydrocarbon such as benzene, toluene or xylenes. However, the conversion of ethylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to ethylene homopolymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000, and tough resinous ethylene homopolymers having an approximate specific viscosity ($\times 10^5$) of 10,000 to more than 300,000. By the operation of the present inventive process it has been possible for the first time, so far as is known, to produce tough ethylene polymers having specific viscosities ($\times 10^5$) of well over 100,000, and even over 300,000. In addition, the process of the present invention can be employed to effect the copolymerization of ethylene with other polymerizable materials and particularly with propylene. Propylene alone has been polymerized, by the employment of the catalysts of the present invention, in low yield to extremely high molecular weight, rubber-like polymers, in addition to oils and grease-like solids. Other polymerizable materials such as n-butylenes, isobutylene, acetylene, isoprene, etc., may be copolymerized with ethylene to a certain extent but the resultant polymers thus far produced closely resemble polymers obtained with ethylene alone.

An important feature of my process is the employment of a solid catalyst comprising essentially a gamma-alumina base and a molybdenum-oxygen compound wherein the molybdenum is present in a sub-hexavalent state, the preferred example of the latter being reduced molybdenum oxide ($MoO_3$). The relative proportions of gamma-alumina base to supported molybdena is not critical and may be varied throughout a relatively wide range provided that each component is present in amounts of at least approximately 1%. Molybdena alone, whether in reduced or unreduced state, is ineffective and likewise gamma-alumina by itself is ineffective. The preferred molybdena-alumina weight ratios are in the range of about 1:20 to 1:1, or approximately 1:4. A large number of other common catalyst supports have been tested with various amounts of molybdena and found to be ineffective. Likewise, other catalyst components recognized as equivalents for molybdenum oxide in hydroforming have been found ineffective in my process even when supported on gamma-alumina. I employ a conditioned alumina-molybdena catalyst composed of gamma-alumina base containing about 1 to 80%, preferably about 5 to 35%, or approximately 20%, of molybdena (or other compound of molybdenum and oxygen) supported thereon.

The gamma-alumina base of the catalyst may be prepared in any known manner and the molybdenum may likewise be incorporated in or deposited on the base in any known manner. Excellent results have been obtained with alumina-molybdenum catalysts of the type conventionally employed for effecting commercial hydroforming, the word "hydroforming" being employed to mean processes of the type described in U. S. Letters Patent 2,320,147, 2,388,536, 2,357,332, etc. Such catalysts usually fall into one of three categories from the standpoint of alumina base preparation:

(1) The "activated alumina" type prepared from hydrated alumina (commercially marketed as "Kellogg" catalyst),
(2) The gel type alumina base prepared by precipitating a gel from an aluminum salt solution (commercially marketed as Oronite catalyst), and
(3) The colloidal gel type base prepared from aluminum metal (commonly known as Indiana gel caaylst).

With respect to preparation of gamma-alumina by dehydration of hydrated aluminas, reference may be made, for example, to Ind. Eng. Chem. 42, 1398 (1950), Ind. Eng. Chem. 37, 158 (1945), U. S. 2,453,327, and to Colloid Chemistry, 2nd edition (1949), Harry D. Weiser, John Wiley and Son, Inc., New York. The term $hAl_2O_3$ as used hereinafter refers to "activated alumina" prepared from hydrated alumina. Gamma-alumina preparation by gel precipitation from salt solutions is disclosed, for example, in U. S. 2,432,286, 2,481,824, etc.; alumina bases prepared by the "precipitated gel from aluminum salt" method will be hereinafter designated $sAl_2O_3$. Preparation of alumina supports from metallic aluminum is disclosed, for example, in U. S. 2,274,634 (Re. 22,196), 2,345,600, 2,371,237, etc.; catalyst bases thus made from aluminum metal will be hereinafter designated $mAl_2O_3$.

While no novelty is claimed in the method of making alumina bases for the catalyst composition, it is important that the alumina in the base be in the gamma form and it is desirable to employ alumina bases or finished catalysts having surface areas in the range of 40 to 400 square meters per gram, as measured by nitrogen or n-butane adsorption (BET method). The molybdena or other molybdenum-oxygen compound, such as cobalt molybdate, may be incorporated in the catalyst base in any known manner, e. g. by impregnation, co-precipitation, co-gelling, and/or absorption, and the catalyst base and/or finished catalyst may be heat stabilized in the known manners heretofore employed in the preparation of hydroforming or hydrofining catalysts. Cobalt molybdate catalysts may be prepared as described in U. S. 2,393,288, 2,486,361, etc. The catalyst may be stabilized with silica (U. S. 2,437,532-3) or with aluminum orthophosphate (U. S. 2,440,236 and 2,441,297) or other known stabilizer or modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531-2). Oxides of other metals such as magnesium, nickel, zinc, chromium, vanadium, thorium, etc., may be present in minor amounts, below 10 weight per cent and preferably below 1 weight per cent of the total catalyst. The catalyst, however, should be substantially free from oxides of alkali metals and iron, the latter being tolerable up to about 1%, but the former being maintained at as low a figure as possible.

I have found that the so-called "spent" molybdena-alumina catalysts from naphtha hydroforming operations are highly active catalysts for the polymerization of ethylene. The spent molybdena-alumina catalysts actually contain a substantial proportion of sulfur derived by the reaction of the molybdenum component of the catalyst with sulfur compounds contained in the naphtha being hydroformed or with $H_2S$ produced by hydrogenation of sulfur compounds during hydroforming; the evidence indicates that a substantial proportion of the molybdenum in the spent catalyst is present as a sub-hexavalent molybdenum sulfide, probably mostly $MoS_2$. By "spent" hydroforming catalyst it is intended to denote a catalyst containing coke-like hydrocarbon materials and one which can be regenerated by the conventional methods to its active state for hydroforming. When a molybdena-alumina catalyst which has been employed for naphtha hydroforming has been regenerated many times it at last reaches a "dead" state from which it cannot be regenerated; this "dead" state is associated with the conversion of gamma-alumina in the catalyst to the low surface area alpha-alumina, as determined by X-ray diffraction analysis.

The alumina-molybdena catalyst must be conditioned or activated before it is useful for effecting ethylene polymerization and the conditioning step is of great importance. It appears that at least a part of the molybdenum must be present in the final catalyst in a sub-hexavalent condition. Since molybdenum is usually composited with the absorptive alumina in the form of a hexavalent molybdenum compound, such as $MoO_3$ which can be produced by decomposition of ammonium paramolybdate, it is necessary to subject a catalyst to the conditioning or reducing step before it is effective for catalyzing ethylene polymerization. The conditioning or reducing step is preferably effected with hydrogen although other reducing gases such as carbon monoxide, mixtures of hydrogen and carbon monoxide (water gas, synthesis gas, etc.), sulfur dioxide, hydrogen sulfide, etc., may be employed. The temperature of the conditioning step should be upwards of about 300 to 350° C., but usually not higher than about 650° C., the best conditioning temperature usually being in the range of about 400 to 500° C., e. g. about 450° C. The hydrogen partial pressure in the conditioning step may range from ordinary pressure to 3000 p. s. i. g. or more, but for practical purposes is usually in the range of about 50 to 500, e. g. about 200 p. s. i. g. The time required for the conditioning step is dependent upon the particle size of the catalyst and its molybdena content. With a particle size of about 4 to 6 mesh, a molybdenum oxide content of about 7.5% at about 200 pounds pressure, and at a temperature of about 460° C., most effective conditioning with hydrogen is obtained at a time of about 15 minutes; in this case some conditioning was effected at a time interval as low as 1 second or as long as 6 hours or more. With increasing amounts of molybdena on the catalyst, longer conditioning treatments are necessary and with decreased particle size, shorter times of conditioning are required. Thus, good activation of powdered catalyst containing 34% molybdena was obtained in 15 seconds, while this short time effected only fair conditioning of powdered catalyst containing 28% molybdena. For large particle sizes of the order of 2 to 6 mesh containing 7.5 to 30% or more of molybdena, the optimum conditioning time lies in the range of about 15 seconds to 15 hours, although usually 6 hours is ample.

The conditioning treatment hereinabove described is required not only for fresh catalyst, but is also required for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by burning combustible deposits therefrom with oxygen followed by the conditioning step. It has been observed that the conditioning treatment necessary to effect reactivation of catalysts from which polymer product has been removed can be effected at somewhat lower temperatures than would be effective in the initial conditioning of fresh catalyst preparations.

The catalysts, comprising essentially a sub-hexavalent molybdenum compound supported upon an absorptive alumina, can be employed in forms and sizes heretofore conventional in hydroforming operations with these and similar catalysts, for example, as pellets of generally cylindrical, spherical, or other shapes, or even in the form of coarse lumps. Conventionally, molybdena-alumina hydroforming catalysts are prepared by pelleting catalyst particles of which 100 per cent pass through a 30 mesh per inch screen and which are retained to the extent of about 50 per cent on 100 mesh per inch screen. The pellets conventionally employed may range in size from about 2 to about 6 mesh per inch. A suitable form of pellet is of generally cylindrical shape, ⅜ inch long and ⅜ inch diameter. Powdered catalysts appear to be extremely active for polymerization, inducing ethylene polymerization at a higher rate to produce generally higher molecular weight polymers than relatively coarse catalysts. However, the small catalyst particles appear to become rapidly coated with solid, high molecular weight polymer and it is necessary to effect efficient removal of said polymer, e. g., by employing high solvent:catalyst ratios such as 5–50 pounds of solvent per pound of catalyst in the reactor.

The charging stock to the present polymerization process preferably comprises essentially ethylene. The ethylene charging stocks may contain inert hydrocarbons, as in refinery gas streams, for example, methane, ethane, propane, etc. When the charging stock contains propylene as well as ethylene, both these olefins contribute to the production of resinous high molecular weight products. The charging stock may contain other components such as sulfur dioxide, carbon monoxide, etc., and it may contain other polymerizable materials such as butylene, acetylene, isoprene, etc.

It has been found that the inclusion of oxygen with the feed stock effects temporary poisoning of the catalyst, possibly through the mechanism of oxidizing molybdenum in the catalyst to the hexavalent state, but that the catalyst can be reactivated by reduction. It is therefore, desirable to minimize or avoid the introduction of oxygen into contact with the catalyst. Water, in the form of steam, has been found to effect an irreversible poisoning of molybdena-alumina catalysts so that they cannot thereafter be reactivated by purging or reducing treatments alone. It is, therefore, very desirable that the introduction of water or materials which produce water in contact with the catalyst in the present process be avoided.

In general, polymerization can be effected in the present process at temperatures between about 75° C. and about 325° C. Increasing the polymerization temperature tends to reduce the average molecular weight of the polymer produced by the process. It is often desirable to select a polymerization temperature which is at least equal to the melting or softening point of the solid polymerization product. Usually polymerization is effected in the present process at temperatures between about 110° C. and about 275° C. or the preferred narrower range of 130°–260° C. As will be noted from the specific examples hereinafter supplied, the conjoint use of polymerization temperatures between about 200° C. and about 250° C. and a liquid aromatic hydrocarbon reaction medium such as benzene or xylene is highly desirable in producing ethylene polymers having specific viscosities ($\times 10^5$) ranging on the average from about 10,000 to about 30,000 in continuous operations with relatively long on-stream periods and clean catalysts.

It has been found that the present process can be employed for the production of relatively high molecular weight ethylene hetero- and homopolymers at relatively low pressures. For example, at a polymerization pressure of only about 1100 p. s. i. g., ethylene has been converted in substantial measure, according to the present process, to a homopolymer having a specific viscosity ($\times 10^5$) of about 200,000. These results are astounding when it is borne in mind that in prior art processes for the thermal polymerization of ethylene (as described in U. S. Patent 2,153,553) or polymerization of ethylene in the presence of oxygen as the catalyst (U. S. Patent 2,188,465), pressures in excess of 30,000 p. s. i. g. lead to the production of ethylene polymers having relatively low molecular weight, such as 24,000, as determined by the Staudinger specific viscosity method. The process of the present invention can be effected to some extent even at atmospheric pressure. The upper limit of polymerization pressure is dictated by economic considerations and equipment limitations and may be 10,000 p. s. i. g., 20,000 p. s. i. g., or even more. A generally useful and economically desirable polymerization pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually selected between about .1 and about 10 volumes, preferably about .5 to 5 or about 2 volumes of ethylene solution in a liquid reaction medium, which is usually an aromatic hydrocarbon such as benzene or xylenes. The amount of ethylene in such solutions should be in the range of about 1 to 30% by weight, preferably about 2 to 10 weight per cent or, for example, about 4 to 5 weight per cent. In batch operations, operating periods of between about one-half and about 10 hours, usually between about 1 and about 4 hours, are employed and the reaction autoclave is charged with ethylene as the pressure falls as a result of the ethylene conversion reaction.

Ethylene can be polymerized in the gas phase and in the absence of a liquid reaction medium by contact with the molybdenum hydroforming-type catalysts employed in the present process. Upon completion of the desired polymerization reaction it is then possible to treat the catalyst for the recovery of the solid polymerization products, for example by extraction with suitable solvents. However, in the interests of obtaining increased rates of ethylene conversion and of continuously removing said conversion products from the catalyst, it is desirable to effect the conversion of ethylene in the presence of suitable liquid reaction media. The liquid reaction medium may also be employed as a means of contacting the ethylene with catalyst by employing the technique of preparing a solution of ethylene in the liquid reaction medium and contacting the resultant solution with the polymerization catalyst. Usually it is preferred to employ inert liquid organic materials such as hydrocarbons, particularly aromatics such as benzene, toluene, xlyenes, and alkylated aromatics as reaction media in the present process.

The liquid reaction medium employed in the present process appears to perform a variety of functions, and to perform these functions in varying degrees depending upon the operating conditions, catalyst and identity of the medium. Thus, the liquid reaction medium appears to function as a solvent for the ethylene to bring the ethylene into the necessary contact with the catalyst surface and/or growing ethylene polymer chain. The liquid reaction medium may function to protect the growing polymer chain from chain breakers, such as reaction-inhibiting impurities in the feed stock, polymer already formed upon certain parts of the catalyst surface, etc. The liquid reaction medium serves to reduce the viscosity of the solid polymer retained upon and within the catalyst and thus may facilitate the process of transferring ethylene where it is needed. The medium dissolves some of the normally solid product from the catalyst surface. The liquid reaction medium makes possible a solid-liquid interface in which the growing ethylene polymer chain may be oriented and from which it may react with ethylene supplied from solution in the medium and/or from the gas phase. It should be understood, however, that I am in nowise bound by the theoretical considerations herein advanced to explain possible modes of action of the inert liquid reaction medium.

The fact remains that the inclusion of the liquid medium in the polymerization reaction zone in contact with the catalyst produces an unpredictable and desirable change in the polymerization of ethylene conducive to the formation of high yields of normally solid hydrocarbon products. A particularly desirable effect of the liquid reaction medium is to increase substantially the rate of ethylene polymerization.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, I may employ such aromatic hydrocarbons as ethylbenzene, isopropylbenzene, n-propylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

I may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

The aromatic hydrocarbons may contain more or less saturated hydrocarbons, as commercially produced, but should be freed of sulfur compounds, polyolefins and aromatic olefins such as styrene before use in the present invention by acid treatment, e. g., with anhydrous p-toluenesulfonic acid, sulfuric acid, or by equivalent treatments, for example with maleic anhydride, sodium, etc., or by combinations of suitable treatments.

Certain classes of aliphatic hydrocarbons can also be employed as a liquid hydrocarbon reaction medium in the present process. Thus, I may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, I may employ straight run naphthas or kerosenes containing alkanes and cycloalkanes. Specifically, I may employ liquid or liquefied alkanes such as n-pentane, n-hexane, 2,3-dimethylbutane, n-octane, n-decane, n-dodecane, cyclohexane, methylcyclohexane, dimethylcyclopentane, ethylcyclohexane and the like.

I may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

In addition to, or as a less desirable substitute for, the liquid hydrocarbon reaction media of the type above described, I may employ inert chlorinated hydrocarbons such as chlorobenzene, paradichlorobenzene and the like.

The liquid hydrocarbon reaction medium may be present in the polymerization reaction zone in proportions of about 10 to about 99 per cent by weight, based on the weight of both ethylene and reaction medium. The liquid hydrocarbon reaction medium is present in the reaction zone as a distinct liquid phase. At low ratios of ethylene to the hydrocarbon reaction medium, for example ratios between about 1 and about 30 per cent, temperature control during the course of the ethylene conversion process can be readily accomplished owing to the presence in the reaction zone of a large liquid mass having relatively high heat capacity. The liquid hydrocarbon reaction medium can, moreover, be cooled by indirect heat exchange inside or outside the reaction zone of a large liquid mass having relative-concentrations in the hydrocarbon reaction medium also results in a marked reduction in the rate of accumulation of solid polymers on the catalyst in continuous operations.

The present polymerization process is amenable to a considerable variety of processing techniques and expedients. Thus, when polymerization of ethylene is effected from the gaseous phase and in the absence of a liquid hydrocarbon reaction medium, the catalyst may be employed in the form of fluidized particles or a fluidized fixed bed of particles, as a fixed bed, or a counter-current moving bed of particles; these techniques being well known in the art of vapor phase hydrocarbon conversion, particularly catalytic cracking, and not being part of the claimed invention, need not be detailed here.

Catalyst coated with solid polymers produced in such vapor phase processes can be treated to recover solid polymerization products and to cleanse the catalyst, employing as solvents liquid hydrocarbons which may be the same as the liquid hydrocarbon reaction media above described, certain chemically inert chlorinated hydrocarbon solvents or other solvents. The catalyst thus cleansed can be returned to the process, preferably after being subjected to an activation treatment with a reducing gas, such as hydrogen. If desired, the extracted catalyst can be subjected to alternate oxidation and reduction treatments to reactivate it.

A fixed bed reactor with either downflow or upflow of ethylene and liquid hydrocarbon reaction medium can be employed. Parallel fixed bed reactors can be employed to obtain continuous operation, as in fixed bed hydrocarbon catalytic cracking units, one bed being freed from polymer and/or reconditioned while the other bed is on stream by suitable manual or automatic time-cycle valve operations to control the flows of ethylene, liquid hydrocarbon reaction medium, solvent and conditioning or regeneration gases to each bed of catalyst.

A moving bed or slurry operation can be employed, in which a slurry of catalyst in the liquid hydrocarbon reaction medium is allowed to flow downwardly through a tower or through one or more tubes. Ethylene or a solution of ethylene in liquid hydrocarbon reaction medium is injected into the lower portion of the tower or tubes and, optionally, at various elevations within the tower or tubes. A slurry of catalyst and solid polymerization products is withdrawn as one stream from the reactor and unconverted ethylene and/or diluent gases and/or relatively low boiling polymerization products are withdrawn from the reactor as a second stream. In the moving bed operation, the solid ethylene polymers are separated from the catalyst in a zone external to the reaction zone. Thus, the catalyst can be extracted with the liquid hydrocarbon reaction medium or with a specially selected wax solvent in suitable equipment and the catalyst can then be recycled to the reactor. If catalyst activity has deteriorated seriously, the polymer-freed catalyst can be subjected to a regeneration treatment prior to its recycle to the reaction zone.

As will be apparent, other types of reactor may also be employed. Thus, the polymerization can be carried out batchwise in autoclaves equipped with stirring equipment, for example in autoclaves equipped with magnetically-operated stirring devices. Likewise, stirred autoclaves can be employed even for continuous operations. A type of reactor which may be employed is that described in U. S. 2,493,917. In another method of operation, catalyst, ethylene and liquid hydrocarbon reaction medium can be passed concurrently through a reaction tube or coil, thence to a separator.

In carrying out the polymerization of ethylene in contact with the catalysts of the present invention and liquid aromatic hydrocarbon reaction media, it was found that the polymers which dissolved in the reaction medium were usually characterized as being of substantially lower specific viscosity than the polymers which were retained upon and within the catalyst. Also, successive extraction of the catalyst containing polymers removed polymer fractions of successively increasing specific viscosity.

It is desirable to remove occluded solid resinous conversion products from the catalyst and to reactivate the catalyst when about 10 to about 300 grams of said resinous conversion products have accumulated per 100 grams of catalyst. It has been observed that substantial reduction in activity of the catalyst is apparently not due only to the accumulation of solid resinous ethylene conversion products thereon, since extraction of said resinous products from the catalyst is in itself not enough to fully restore catalyst activity. It has been found that catalyst containing 10 to 30 grams of resinous products per 100 grams of catalyst can be regenerated by a treatment of the type employed initially to activate the fresh catalyst, preferably following extraction of polymer and/or resinous materials from the partially spent catalyst.

The regeneration of partially spent catalyst by treatment with hydrogen or other reducing agents can be effected under the same conditions employed for initial activation of a batch of fresh catalyst, but it has been found possible to use much milder conditions, i. e., lower temperatures and pressures. Thus some regeneration of a partially spent cobalt molybdate-alumina catalyst can be effected under the very mild conditions of 65° C., a partial pressure of hydrogen of 500 p. s. i. g. and time of 1.0 hour.

In order to extract the high molecular weight ethylene polymers which tend to be tenaciously retained within the pores of the catalyst, it is important to conduct the extraction operation at a minimum temperature which lies between about the softening points and melting points of the polymers, usually temperatures within the range of about 80° C. to about 150° C., and which may extend to considerably higher temperatures, e. g., up to about 325° C. When a relatively low boiling solvent such as benzene is employed it will be necessary to conduct the extraction or catalyst cleansing under sufficient pressure to maintain the solvent substantially in the liquid phase at the desired extraction temperature.

The solute can be recovered from the solvent by cooling, by evaporation of the solvent from the solute or by dilution of the solution with antisolvents, such as acetone, methyl ethy ketone, methyl isobutyl ketone, etc. A suitable method of operation involves cooling the hot solution to effect precipitation of one or more fractions of solute, the highest specific viscosity fractions of the solute being the first precipitates, and separating one or more precipitates from the remaining solution by filtration. Sometimes the operation of the present process leads to the production of more or less greaselike low molecular weight polymers having the consistency of petrolatum or soft grease and characterized by an approximate molecular weight range of 300 to 700; the grease-like products are characterized by their solubility in aromatic hydrocarbon solvents such as xylenes even at room temperature. The grease-like ethylene polymers (which may contain aromatic groups introduced by alkylation) can be separated from the xylene solvent by evaporation of the latter, preferably after separating high molecular weight polymers by cooling and filtration, as described above.

In Table 1 are presented data obtained in illustrative batch polymerization tests. The reactor employed was a rocking bomb or autoclave having 183 ml. capacity. In each instance, except as otherwise noted, the reactor was charged with catalyst and the catalyst was conditioned or activated. Except as otherwise indicated, the conditioning or activation was in the reactor with hydrogen gas at about 463° C., 150 p. s. i. g. and 1 hour. The activation process apparently reduced $MoO_3$ on the alumina in substantial measure to a lower state of oxidation. The reactor was then charged with 100 ml. of liquid reaction medium and pressured with commercial cylinder ethylene to about 1100 p. s. i. g. at room temperature. The polymerization was effected over periods of about 2 to 4 hours at the temperatures indicated. Ethylene was pressured into the reactor intermittently to maintain ethylene pressure. Upon completion of a polymerization test, the reactor was allowed to cool to room temperature, then depressured to atmospheric pressure, opened and the catalyst-liquid reaction medium mixed with additional solvent and subjected to extraction at the normal boiling point of the solvent. After the extraction operation, the clear solution was decanted from the catalyst.

A substantial proportion of the polyethylene, especially the polymers of high molecular weight, are more or less tenaciously retained upon and within the catalysts. Extraction of the catalysts with a suitable solvent, usually boiling commercial xylenes, removes some of the polymer, which separates from solution on cooling. The "grease" product of the tables is a relatively low molecular weight polyethylene (about 300–700 molecular weight by the Menzies-Wright method) obtained by evaporating the xylene solvent after filtering the high molecular weight polyethylenes which separate from the solvent at temperatures below the boiling point. The "grease" is readily soluble in xylenes and other aromatic solvents at room temperature.

The catalysts are designated in Table 1 (and others) by the type of gamma-alumina base and the weight per cent of contained molybdenum oxide (as $MoO_3$). The catalysts were usually employed as pellets of ⅜-inch diameter and ⅜-inch length. The $mAl_2O_3$ catalyst which was employed was prepared by the coprecipitation of molybdena, from ammonium paramolybdate, with an alumina sol prepared by the action of dilute acetic acid and mercuric oxide on aluminum having a purity in excess of 99.5 per cent, substantially as described in U. S. 2,371,237. The cobalt molybdate-alumina catalysts employed were commercial preparations stabilized by a small proportion of silica, containing 3.2% CoO and 8.8% $MoO_3$ supported upon an adsorptive alumina. The $hAl_2O_3$ and $sAl_2O_3$ catalysts were commercial hydroforming catalysts as marketed by the M. W. Kellogg Co. and the Oronite Chemical Co., respectively.

The specific viscosity (Nsp)$\times 10^5$ of the high molecular weight polyethylenes was determined by measurements performed upon solutions containing 0.125 gram of polyethylene per 100 ml. xylene at a temperature of 110° C.

Important variations from test to test are usually indicated in the "Remarks" in Table 1 and are discussed in the textual treatment of the data following Table 1 herein.

Table 1

| Run No. | Catalyst | Weight of catalyst, grams | Liquid reaction medium | Polym. temp., °C. | Polyethylene grams | Polyethylene Nsp×10⁵ | Grease, grams | Remarks |
|---|---|---|---|---|---|---|---|---|
| 1 | sAl₂O₃, 8% MoO₃ | 25 | Benzene | 130 | 0 | | 0 | Catalyst not activated before use. |
| 2 | ----do---- | 25 | ----do---- | 130 | 20 | 50,000 | 0.5 | H₂-activated catalyst. Tough high molecular weight polyethylene was produced. |
| 3 | ----do---- | 76 | None | 132 | 21 | | 0.7 | Extremely high molecular weight polyethylene was produced. |
| 4 | ----do---- | 25 | ----do---- | 121 | 1.2 | Insoluble | 0.2 | Reaction at 50 p. s. i. ethylene pressure. |
| 5 | ----do---- | 25 | Xylenes | 121 | 2.3 | ----do---- | 0.6 | Ethylene pressure was 50 p. s. i. g. |
| 6 | mAl₂O₃, 7.5% MoO₃ | 25 | Benzene | 130 | 30 | 27,000 | | |
| 7 | ----do---- | 25 | Xylenes | 130 | 18 | | | |
| 8 | ----do---- | 25 | Benzene | 132 | 24 | | | H₂-activation for 1 hr. at 150 p.s.i.g. and 463° C. |
| 9 | hAl₂O₃, 9% MoO₃ | 25 | ----do---- | 121 | 13.6 | 171,000 | | |
| 10 | sAl₂O₃, 8% MoO₃ | 10 | ----do---- | 160 | 4 | | Trace | Catalyst was 20-60 mesh. Reactor was a bomb provided with an internal magnetically-operated stirring device (Magnedash reactor). |
| 11 | ----do---- | 10 | ----do---- | 130 | 0.7 | | | Catalyst was powdered in ball mill. |
| 12 | mAl₂O₃, 7.5% MoO₃ | 15 | ----do---- | 121 | 0.1 | | | Catalyst was 10-60 mesh. |
| 13 | mAl₂O₃, 20% MoO₃ | 15 | ----do---- | 230 | 7.9 | Insoluble | 0.4 | 100-150 mesh catalyst. |
| 14 | sAl₂O₃, 8% MoO₃ | 25 | ----do---- | 122 | 14 | 196,400 | | The catalyst had been used in commercial naptha hydroforming operations. It contained 0.7% sulfur. *Extracted from the catalyst. |
| 15 | Cobalt-molybdate-Al₂O₃ | 25 | ----do---- | 124 | *21 (0.8) (3.0) | 43,800 120,000 | | |
| 16 | mAl₂O₃, 7.5% MoO₃ | 15 | ----do---- | 127 | 0.25 (3.8) | 360,000 Insoluble | | 25 g. propylene added to 100 ml. benzene and bomb pressured to 1,000 p.s.i.g. with ethylene. |
| 17 | ----do---- | 15 | ----do---- | 127 | 4.5 | | | Catalyst was activated by treatment with CO at 400° C. and 30 p.s.i.g. for 6 hours. |
| 18 | ----do---- | 25 | ----do---- | 232 | 7.2 | 20,400 | 0.5 | CO activation at 540 °C., 40 p.s.i.g. |
| 19 | ----do---- | 25 | ----do---- | 232 | 8.3 | 32,400 | 0.3 | CO activation at 540° C., 850 p.s.i.g. |
| 20 | sAl₂O₃, 8% MoO₃ | 25 | Xylene | 100 | 5.6 | | 0.1 | 100° C. reaction temperature. Appreciable pressure drop was observed at 80° C. |
| 21 | ----do---- | 25 | Xylenes | 205 | 10.1 | 36,700 | 0.5 | 205° C. reaction temp. |
| 22 | ----do---- | 15 | ----do---- | 232 | 3.4 | | 0.6 | 232° C. reaction temp. |
| 23 | ----do---- | 25 | Xylene (15 ml.) | 243 | 8.4 | 40,700 (a) 64,700 (b) | 0.6 | 243° C. reaction temperature. (a) The first 1.4 g. of polymer extracted from catalyst with boiling xylene. (b) The second 1.1 g. of polymer extracted from catalyst with boiling xylene. |
| 24 | ----do---- | 25 | Xylene | 260 | 5.7 | 26,600 (a) 166,100 (b) | 0.8 | 260° C. reaction temperature. (a) The first 3.5 g. of polymer extracted from catalyst with boiling xylene. (b) The second 1.1 g. of polymer extracted from catalyst with boiling xylene. |
| 25 | ----do---- | 25 | ----do---- | 285 | 3.9 | 12,200 | 1.8 | 285° C. reaction temperature. |
| 26 | ----do---- | 25 | ----do---- | 338 | | | | 338° C. reaction temperature. The polymer was largely oil. |
| 27 | ----do---- | 34 | ----do---- | 127 | 0.1 | | | Oxygen, 25 mol. percent of the MoO₃ originally present in the catalyst was charged after catalyst activation and prior to polymerization. |
| 28 | mAl₂O₃, 7.5% MoO₃ | 15 | Xylenes | 230 | 1.0 | 22,500 | 0.5 | Pelleted catalyst was used and was activated with H₂ for 5 min. at 450° C. Prior to polymerization, 20% of oxygen, based on MoO₃ in the catalyst before activation, was added. |
| 29 | ----do---- | 15 | ----do---- | 230 | 3.0 | 32,500 | 0.4 | Pelleted catalyst was used and was activated with H₂ for 5 min. at 450° C. Prior to polymerization, 10% of oxygen, based on MoO₃ in the catalyst before activation, was added. |
| 30 | ----do---- | 15 | ----do---- | 230 | 7.9 | 43,600 | 0.3 | Pelleted catalyst was used and was activated with H₂ for 5 min. at 450° C. |
| 31 | ----do---- | 15 | ----do---- | 230 | 3.3 | 55,500 | 0.4 | Compare with Run 30. 1.65 weight percent H₂O, based on total weight of catalyst was added. |
| 32 | ----do---- | 15 | ----do---- | 230 | 1.4 | 40,800 | 0.4 | Compare with Run 30. 3.3 weight percent H₂O, based on total weight of catalyst was added. |
| 33 | ----do---- | 15 | ----do---- | 230 | 6.3 | 47,500 | 0.7 | 18.2 mol. percent of C₂H₂, based on MoO₃ in the catalyst, was added. Compare with Run 30. |
| 34 | ----do---- | 15 | ----do---- | 230 | 8.3 | 35,400 | 0.7 | 51.5 mol. percent of C₂H₂, based on MoO₃ in the catalyst was added. Compare with Run 30. |
| 35 | ----do---- | 15 | ----do---- | 230 | 6.4 | 41,000 | 0.6 | 155 mol. percent of C₂H₂, based on MoO₃ in the cat., was added. Compare with Run 30. |
| 36 | sAl₂O₃, 8% MoO₃ | 15 | Diisobutylene | 230 | 2.0 | Insoluble | 0.7 | |
| 37 | mAl₂O₃, 7.5% MoO₃ | 10 | Benzene | 270 | 2.4 | | | Powdered catalyst was activated with CO at 30 p. s. i. g. and 400° C. for 2 hours. |
| 38 | sAl₂O₃, 8% MoO₃ | 15 | ----do---- | 207 | 0.7 | 55,700 | 0.4 | The catalyst was activated with SO₂ at 460° C. and 30 p. s. i. g. for 1.25 hours. |
| 39 | ----do---- | 15 | n-Decane | 230 | 2.4 | | 1.3 | |
| 40 | ----do---- | 15 | White oil | 230 | 3.1 | 50,100 | | |
| 41 | ----do---- | 15 | Hydroformer bottoms | 230 | 1.6 | Insoluble | | |
| 42 | ----do---- | 15 | 10% chlorobenzene in xylene. | 230 | 0.9 | | | 0.5 g. polymer (Nsp×10⁵=55,100) recovered from solvent. 0.4 g. polymer (Nsp×10⁵=52,800) extracted from the catalyst. |

Table 1—Continued

| Run No. | Catalyst | Weight of catalyst, grams | Liquid reaction medium | Polym. temp., °C. | Polyethylene grams | Polyethylene $N_{sp} \times 10^5$ | Grease, grams | Remarks |
|---|---|---|---|---|---|---|---|---|
| 43 | $sAl_2O_3$, 8% $MoO_3$ | 15 | Amylnaphthalene | 230 | 1.9 | Insoluble | 0.2 | |
| 44 | ----do---- | 15 | p-Xylene | 230 | 3.3 | ---- | 1.1 | 0.9 g. of solid polyethylene in solvent, too insoluble for $N_{sp}$ measurement. 2.4 g. solid polyethylene ($N_{sp} \times 10^5 = 40,700$) extracted from the catalyst. |
| 45 | ----do---- | 15 | 1-octene | 230 | 1.3 | 33,900 | 0.6 | |
| 46 | $mAl_2O_3$, 0% $MoO_3$ | 25 | Benzene | 232 | 0 | ---- | 0 | 6–14 mesh catalyst. 1 hr. activation time. |
| 47 | $mAl_2O_3$, 15% $MoO_3$ | 15 | Xylenes | 230 | 9.0 | 40,400 | 1.2 | Cat. employed as ⅛″ pills. Catalyst was activated with $H_2$ for 5 min. at 450° C. Specific viscosity only of extracted polymer is given. |
| 48 | $mAl_2O_3$, 20% $MoO_3$ | 25 | Benzene | 232 | 18.2 | 49,400 | 0.6 | 6–14 mesh catalyst. 1 hr. activation time. |
| 49 | ----do---- | 15 | Xylenes | 232 | 8.3 | 41,300 | 1.0 | Cat. employed as 3/16″ pills. Catalyst was activated with $H_2$ for 5 min. at 450° C. Specific viscosity only of extracted polymer is given. |
| 50 | $mAl_2O_3$, 34% $MoO_3$ | 25 | Benzene | 232 | 13.3 | 57,000 | 0.7 | 6–14 mesh catalyst. 1 hr. activation time. |
| 51 | $mAl_2O_3$, 50% $MoO_3$ | 25 | ----do---- | 232 | 3.5 | 72,800 | 0.6 | Do. |
| 52 | $mAl_2O_3$, 8%; $MoO_3$, 8%; $ThO_2$ | 15 | ----do---- | 230 | 4.7 | Insoluble | 0.2 | Catalyst activated with $H_2$ for 1 hr. at 450° C. The polyethylene was insoluble in boiling xylene. |
| 53 | $mAl_2O_3$, 8%; $MoO_3$, 8%; $ZrO_2$ | 15 | ----do---- | 230 | 9.4 | ----do---- | 0.2 | Do. |

In run 1 the molybdenum was present in the form of $MoO_3$. It will be noted that no ethylene conversion was obtained, whereas upon conditioning this catalyst (run 2) with hydrogen at 463° C. for 6 hours at a partial pressure of hydrogen of 150 p. s. i. g., a very active ethylene polymerization catalyst was produced. It will be noted that in run 2 a tough, high molecular weight polyethylene was produced.

In run 3, ethylene was polymerized from the gas phase in the absence of a liquid reaction medium. Although an increased amount of catalyst was employed as compared with the amount used in other batch runs, the yield of polyethylene was not substantially increased, indicating a somewhat slower reaction rate in the absence of an inert liquid hydrocarbon. The polyethylene produced in this run was of extremely high molecular weight and was substantially insoluble in boiling xylene.

It will be noted from the data obtained in run 4 that vapor phase polymerization of ethylene even proceeds at the very low pressure of 50 p. s. i. g. to produce a solid ethylene polymer. The polymerization rate can be increased by employing a liquid reaction medium (run 5).

It will be noted from run 6 that one of the outstandingly active catalysts was a synthetic molybdena-alumina gel. A somewhat reduced yield of polyethylene was obtained in run 7 by substitution of xylenes for the benzene employed in run 6.

In run 8 the hydrogen activation of the catalyst was conducted for a period of one hour as compared with 6 hours in run 6, other conditions remaining constant. Nonetheless, a very active polymerization catalyst was produced.

The catalyst employed in run 9 is known in the commercial practice of hydroforming as the "Kellogg Low Soda" catalyst. It is an impregnated catalyst produced by absorbing ammonium molybdate upon a calcined adsorptive commercial alumina and thereafter decomposing the molybdate. Although this catalyst did not appear to have the initial high polymerization activity of the synthetic gel catalysts, it will be noted that an extremely high molecular weight polymer was produced.

The catalyst employed in run 10 was in all essential respects similar to that employed in run 2 but the catalyst particle size was reduced from 4–6 mesh to 20–60 mesh. It will be noted from the results of run 10 that the use of the small particle size catalyst resulted in a lower yield of solid ethylene polymer than the relatively coarse catalyst pellets. When the catalyst size was further reduced by powdering it in a ball mill, the yield of solid polymer was further substantially reduced, as will be apparent from the results obtained in run 11. Similar effects were observed upon reducing the 4–6 mesh gel catalyst of run 6 to 10–60 mesh, as will be apparent from the results obtained in run 12 or to 100–150 mesh, as will be noted from run 13, which should be compared with run 48.

A sulfided molybdena-alumina catalyst which has been partially spent in commercial naphtha hydroforming operations was employed in run 14. It will be noted from the results of this run that a highly active catalyst was obtained which yielded a polyethylene of previously unheard of specific viscosity.

The catalyst employed in run 15 was a commercial cobalt molybdate-alumina catalyst which is conventionally employed in naphtha hydrofining operations, for example as described in Ind. Eng. Chem. 35, 1160 (1943). It will be noted that this is an extremely active catalyst and produces a desirable, tough, high molecular weight polyethylene resin.

A mixed ethylene-propylene charging stock was employed in run 16. Although it appears that a low polymerization rate was encountered, the resinous product had the extremely high specific viscosity $\times 10^5$ of 360,000.

In run 17 synthetic molybdena-alumina gel was activated before use by treatment with carbon monoxide under relatively mild reducing conditions. It will be noted that an active polymerization catalyst was produced. Successful CO catalyst activations at somewhat higher temperature and over a broad pressure range are illustrated in runs 18 and 19.

Runs 20 to 26, inclusive, represent a study of the effects of temperature variation in the polymerization operation, employing a molybdena-alumina gel catalyst. The highest polymer yield was obtained at the lower temperatures in the particular temperature range explored, but it was difficult to remove the polymer from the catalyst by extraction with boiling xylene. At the higher temperatures within the range explored, it was found that the polymer product was of lower molecular weight and was more readily removed from the catalyst by extraction. Operations at about 260° C. in the batch reactor proved to be of value in that the products obtained had good psysical properties and at the same time were readily removable from the catalyst by extraction. The high specific viscosity of the product in run 23 is attributable to the presence of only 15 percent of the usual amount of liquid reaction medium. It will be noted that at 338° C. (run 26) the polymer product was largely oil.

The data obtained in run 27 indicate that the reduced molybdena-alumina catalysts are sensitive to oxygen, fifty mol percent of the quantity theoretically required to oxidize the molybdenum present in the catalyst from the dioxide to the trioxide being sufficient to effect substantial deactivation of the catalyst. These data would appear to indicate that the concentration of the actual active component of the catalyst is substantially less than its total molybdenum content. The effects of oxygen in reducing both the yield and specific viscosity of the polyethylene are likewise illustrated in runs 28 and 29, which should be compared with run 30 as the standard.

Runs 31 and 32, which should be compared with run 30 as the standard, indicate that the presence even of small proportions of water, based on molybdena-alumina catalyst in the reaction zone, markedly reduces the yield of polyethylene, although apparently not its molecular weight. The removal of oxygen and water from ethylene charging stocks in a polymerization process of the present type is claimed in copending application for United States Letters Patent, Serial No. 223,649, filed April 28, 1951.

Runs 33, 34 and 35 indicate that acetylene has only a minor effect on the activity of the catalyst. The addition of even as much as 155 mol percent of acetylene based on the theoretical $MoO_3$ content of the catalyst decreased the polyethylene yield only by about 20%. The addition of acetylene exerted a small lowering effect on the specific viscosity of the polyethylene. An important effect of acetylene addition is a substantial increase in the solubility of the polyethylene polymer in aromatic solvents such as xylenes, benzene, etc., as compared with the polyethylene polymers prepared in the absence of acetylene. An infrared spectroscopical examination of the polymers prepared in runs 33, 34 and 35 failed to reveal an acetylene group therein.

In run 37 a powdered catalyst which had been activated with carbon monoxide proved to be useful for ethylene polymerization. Carbon monoxide activation of relatively coarse catalyst particles was used to produce the catalyst employed in run 17.

The data obtained in run 38 show that sulfur dioxide gas can be employed to activate a molybdena-alumina catalyst for the polymerization of ethylene to a high molecular weight polymer.

In run 39 is was found that n-decane was an efficacious liquid reaction medium for the polymerization of ethylene to a high molecular weight product in the presence of a molybdena-alumina catalyst. In run 40 a U. S. P. white oil was employed as a liquid reaction medium. The white oil had been prepared by heavy sulfuric acid treating and claying of a suitable petroleum oil fraction and consisted largely of saturated polycyclic hydrocarbons. In run 41 a hydroformer bottoms fraction which comprises largely dimethylnaphthalenes, was successfully employed as the liquid hydrocarbon reaction medium. Runs 42, 43, 44 and 45 illustrate the successful use, respectively, of chlorobenzene-xylene, amylnaphthalene, p-xylene and 1-octene as liquid reaction media. Polyethylene grease can be employed as the reaction medium but does not appear to add to the yield of solid polyethylene resin.

Runs 46 to 51, inclusive, are a series in which the essential variation was the molybdena content of the catalyst, over the range of 0 to 50% by weight. It will be noted that the product yield was maximum at about 20% molybdena content in the catalyst upon activation with hydrogen at 455° C. and 200 p. s. i. for 1 hour. The specific viscosity of the product increased with increasing molybdena content of the catalyst.

In runs 52 and 53, alumina-molybdena catalysts containing thoria and zirconia, respectively, were found to be active for the polymerization of ethylene to high molecular weight polymers which were insoluble in large proportions of boiling xlyenes.

In addition to the information tabulated above, the following information serves further to characterize my invention. In a test run with unsupported hydrogen-reduced $MoO_3$ under the standardized conditions employed in batch runs with benzene as the liquid reaction medium, no ethylene pressure drop was observable over a period of 4 hours and no ethylene polymers could be isolated. Molybdic acid powder failed to catalyze solid polyethylenes production at 230° C. and 1000 p. s. i. g. ethylene pressure. It was also found that the employment of a hydrogen-reduced 8% molybdena-activated coconut charcoal catalyst failed to induce ethylene polymerization under the standardized conditions employed in other batch runs. The employment of a commercial $MoS_2$—ZnO—MgO hydrogenation catalyst at 127° C. and 1000 p. s. i. g. ethylene pressure yielded no solid ethylene polymer although a sulfur-containing hydroforming catalyst was active. A commercial $MoS_2$-gamma $Al_2O_3$ catalyst was found to be inactive for the preparation of polyethylene when tested under standardized conditions in a batch reactor. The employment of a hydrogen-activated 7% molybdena-silica gel catalyst produced only a trace of solid product from ethylene under the standardized conditions employed in other batch runs. It would also appear that the alumina component of the catalyst is not effective merely because of its large surface area or pore volume. Activated aluminas usually have BET areas of the order of about 100 to 200 square meters per gram and function as desirable supports, while activated coconut charcoals have, typically, surface areas between about 750 and about 1000 square meters per gram or even more and do not function as desirable supports for molybdenum in the present process. The molybdenum compound component of active catalysts for ethylene polymerization is probably present in the catalysts in extremely finely-divided form, since X-ray diffraction analysis fails to reveal the presence of molybdemum compound.

In Table 2 are presented illustrative data obtained in the polymerization of ethylene in a flow reactor. The flow reactor was a vertical steel tube having an internal diameter of 1.1 inches and volume of 450 ml., packed with a fixed bed of 4-6 mesh catalyst. The reaction tube contained a central well provided with three thermocouples, viz., one at the upper end, one at the middle and one at the lower end of the well. One-fourth inch copper tubing was wound about the reaction tube and air or water was circulated therethrough for temperature control in the reaction tube. Two electrical resistance coils were wound over the copper coils to provide heat. The entire assembly was suitably lagged with insulating material. In the runs reported in Table 2, the partial pressure of ethylene was maintained at 900 p. s. i. g.

for continuous operation since an extremely high molecular weight polymer was formed which plugged the reactor.

In Table 3 are presented data obtained during the continuous polymerization of ethylene by downflow of ethylene and solvent through a hydrogen-activated commercial cobalt molybdate-alumina catalyst containing 3.28 weight per cent CoO and 8.8 weight per cent $MoO_3$ (before hydrogen activation) supported on an active alumina. The space velocity of the ethylene-solvent mixtures in the runs of Table 3 was 2 to 2.5.

Table 3

| Run | 56 | | 57 | 58 | | 59 | |
|---|---|---|---|---|---|---|---|
| | A | C | | A | B | A | C |
| Catalyst | (1) | (1) | (1) | (1) | (1) | (1) | (1) |
| Temperature, °C | 216 | 216 | 216 | 216 | 270 | 216 | 260 |
| Pressure, p. s. i. | 5,000 | 5,000 | 1,300 | 1,500 | 1,500 | 1,500 | 1,500 |
| Percent $C_2H_4$ in feed | 2 | 4 | 4 | 7 | 7 | 4 | 4 |
| Solvent | (2) | (2) | (2) | (2) | (2) | (3) | (3) |
| Average $Nsp \times 10^5$ | 19,000 | 24,700 | 17,800 | 38,100 | 19,200 | 19,000 | 11,000 |
| Maximum polymer output, g./hr./200 g. cat | 2.4 | 8.3 | 7.3 | 7.9 | 4.5 | 9.2 | 16.1 |
| Hours to fall to 2 g./hr./200 g. cat | 8 | 9 | 12 | 10 | | 13 | 26 |
| Total g. polymer produced before rate fell to 2 g./hr | | 35 | 32 | 60 | | 73 | 185 |
| Average rate of polymer production, g./hr | 1.5 | 3.9 | 2.7 | 6 | 3.3 | 5.6 | 7.1 |

1 $CoMoO_4/Al_2O_3$.
2 Xylene.
3 Benzene.

In run 56A, the catalyst activity at the end of 13 hours was 0.25 g. of polyethylene resin per hour per 200 g. of catalyst. At this point the ethylene feed was discontinued and the catalyst was extracted with hot xylene, but no reactivation could be obtained in this manner. The Table 2

| Run No. | Catalyst | Liquid | Polym. temp., °C. | Pressure, p. s. i. g. | Space velocity (g. feed/g. cat./hr.) | Resin grams | $Nsp \times 10^5$ | Grease, grams | Remarks |
|---|---|---|---|---|---|---|---|---|---|
| 54 | $mAl_2O_3$, 7.5% $MoO_3$ | Benzene | 255 | 1,000 | 3.8 | 16 | 8,600 (a) | 8.9 | Time of cuts—<br>(a) After 1 hour.<br>(b) After 2¾ hours.<br>(c) After 3¾ hours.<br>(a) Polymer removed with liq. reaction medium.<br>(b) Polymer remaining on catalyst. Total reaction period was 1¼ hours. |
| | | | | | | 25 | 7,700 (b) | 9.0 | |
| | | | | | | 4 | 7,300 (c) | 4.0 | |
| 55 | do | do | 150 | 800 | 1.6 | 0.7 | 9,600 (a) | 2.2 | |
| | | | | | | 33.0 | 45,500 (b) | 0 | |

In run 54 benzene was circulated downwardly over a hydrogen-activated molybdena-alumina catalyst at such a rate that the reactor was maintained three-fourths full. A partial ethylene pressure of 900 p. s. i. g. was maintained at the top of the reactor and substantially the only ethylene entering into contact with the catalyst was that in solution in the benzene. Solid polymer was produced and was collected in three fractions from the benzene reaction medium, as shown in Table 2. On opening the reactor upon completion of the run, the catalyst was found to be free of accumulated polymer with the exception of the first 2 inches of the catalyst bed, which may have been above the benzene level. The conversion of ethylene to solid polymer in this run was 36 weight per cent. Substantially higher molecular weight ethylene polymers can be obtained by reducing the reaction temperature from 255° C. to a somewhat lower temperature of about 200° C. or 225° C.

In run 55 the reaction temperature was reduced to 150° C., which was somewhat too low catalyst was then treated with hydrogen for 3 hours at 850° F. and 500 p. s. i. g., which markedly reactivated the catalyst, as indicated by the results of run 56C, which followed. The onstream period in run 56C was 22 hours. A comparison of runs 56C and 56A indicates that the reactivation of the catalyst and the increase of ethylene concentration in the feed from 2% to 4% resulted in the production of a higher specific viscosity polymer at a substantially increased rate of production.

Since hydrogenation proved effective for catalyst regeneration, hydrogen was added with the charging stock during run 57, but proved ineffective in prolonging the life of the catalyst. It was observed that a part of the ethylene was converted to ethane. Comparing runs 57 and 56C, it will be observed that reducing the reaction pressure reduced the average specific viscosity of the polymer product and also the average rate of polymer output.

To increase the rate of output of polyethylene, the concentration of the feed in run 58 was raised from 4 to 7%. The data in Table 3 indicate that not only the rate of output was increased (compare runs 57 and 58A), but also the specific viscosity of the product was more than doubled. A possible disadvantage of using a high feed concentration is that the rapid rate of production of high molecular weight polyethylene causes the catalyst to fragment from ⅛ inch pellets to a fine powder. It has been found that ethylene and isobutylene was charged over cobalt molybdate-alumina catalyst to effect more than 95% olefin conversion. There were obtained 4.7 g. solid polymers (Nsp×10⁵=34,800) and 32.6 g. liquid polymer. In each case the solid polymers were very stiff but much more soluble in boiling xylene than polymers of similar specific viscosity derived from the polymerization of ethylene alone.

*Table 4.—Ethylene polymerization—flow reactor*

| Run No | 60 | 61A | 61B | 61C | 61D | 61E | 61F | 61G | 61H | 61I | 62 | 63 | 64 | 65 |
|---|---|---|---|---|---|---|---|---|---|---|---|---|---|---|
| Catalyst | (¹) | (¹) | (¹) | (¹) | (¹) | (¹) | (¹) | (¹) | (¹) | (¹) | (¹) | (¹) | (¹) | (¹) |
| Activation with H₂: | | | | | | | | | | | | | | |
| Temp., °C | 450 | 450 | 450 | 450 | None | 450 | None | 450 | 450 | 450 | 450 | 450 | 450 | 450 |
| Time, minutes | 5 | 5 | 5 | 5 | None | 5 | None | 5 | 5 | 5 | 5 | 15 | 15 | 15 |
| Solvent | (²) | (²) | (²) | (²) | (²) | (²) | (²) | (²) | (²) | (²) | (³) | (³) | (³) | (³) |
| Ethylene conc. in solvent | 11.3 | 15.2 | 11.5 | 20.0 | 20.0 | 15.5 | 17.5 | 17.5 | 13.0 | 3.9 | 15.0 | 15.0 | 4.0 | 9.3 |
| Temperature, °C | 230 | 243 | 250 | 243 | 238 | 238 | 236 | 266 | 240 | 230 | 230 | 230 | 230 | 230 |
| Pressure, p. s. i | 1,000 | 1,200 | 1,200 | 1,200 | 1,200 | 1,200 | 1,200 | 1,200 | 1,200 | 1,200 | 1,000 | 1,000 | 1,000 | 500 |
| Space velocity, v./v./hr | 2.5 | 2.6 | 3.0 | 2.7 | 2.6 | 2.2 | 2.3 | 1.9 | 2.3 | 2.5 | 1.3 | 4.7 | 4.9 | 4.9 |
| Duration of run, minutes | 62 | 69 | 121 | 95 | 54 | 143 | 70 | 93 | 164 | 143 | 281 | 86 | 106 | 93 |
| Ethylene conv. (olefins), percent | 65 | 78 | 54 | 62 | 23 | 82 | 39 | 84 | 48 | 56 | 72 | 43 | 42 | 30 |
| Total products, grams | 28 | 41 | 58 | 30 | 10 | 50 | 7 | 37 | 37 | 45 | 70 | 36 | 23 | 31 |
| Product distribution, percent: | | | | | | | | | | | | | | |
| Alkylate | } 46 | } 58 | } 48 | } 37 | } 59 | } 42 | } 56 | { 41 | 21 | 57 | 15 | 13 | 21 | 11 |
| Polyalkylate and polymer | | | | | | | | 32 | 26 | 14 | 15 | 11 | 26 | 6 |
| Solid polyethylenes | 54 | 42 | 52 | 63 | 41 | 58 | 44 | 27 | 53 | 29 | 70 | 76 | 53 | 83 |
| Nsp × 10⁵ (solid polyethylenes) | 22,200 | 21,900 | 17,900 | 22,100 | 39,000 | 19,200 | | 8,300 | 8,900 | 18,500 | 21,900 | 18,000 | 18,000 | 17,000 |

¹ sAl₂O₃—8% MoO₃.
² Benzene.
³ Xylene.

the powder can simply be re-pelleted to produce an active catalyst. Between parts A and B or run 58 hydrogen reactivation of the catalyst was effected at 850° F. and 300 p. s. i. g. hydrogen pressure, for about one-half hour. Run 58A lasted 9 hours and 58B about 7½ hours. In part B of run 58, the temperature was raised to 270° C. As a result, the average specific viscosity fell sharply (38,100 in part A to 19,200 in part B). Catalyst reactivation by hydrogen was practiced following run 58B before the catalyst activity fell to the production rate of 2 grams of polymer per hour.

In run 59, benzene was substituted for xylene as the reaction medium, with consequent substantial increase in the average rate of polymer production despite the relatively low polymerization pressure and ethylene concentration which were employed. Catalyst regeneration or reactivation by hydrogen intervened between parts A and C of run 59. The relatively low molecular weight of the polymer obtained in run 59C is due to the relatively high operating temperature of 260° C. It is of interest to note that the hydrogen from the reactivation treatment of the catalyst was allowed to remain in the reactor while feed was introduced in run 59C.

A solution of 34% propylene and benzene was prepared and passed downwardly through a bed of molybdena-alumina catalyst which had been activated by hydrogen treatment at 463° C. and 150 p. s. i. g. hydrogen pressure for 1½ hours before use. It was found that propylene was converted to the extent of less than 1% in this operation to produce a polymer having a low molecular weight.

A 20% solution in benzene of a mixture of 68% ethylene and 32% isobutylene was contacted with cobalt molybdate-alumina catalyst at 154° C. and 1200 p. s. i. g. for a period of 107 minutes. Olefin conversion exceeded 95%. From the benzene solvent there were recovered 1.4 g. solid polymer (Nsp×10⁵=41,600) and 5.5 g. liquid polymer. In addition, 5 g. of solid polymer were extracted from the used catalyst. In a similar run, a 33% solution in benzene of a mixture of 50% each of Table 4 is devoted to data obtained on flow polymerization of ethylene in solution in the indicated aromatic hydrocarbon solvents in contact with an 8% MoO₃-gamma alumina catalyst. Run 61 was carried out in nine run periods as a life test, with hydrogen reactivation of the catalyst between periods, except after periods C and E. In general, it will be noted that the activated MoO₃-Al₂O₃ catalyst was far less sensitive to variations in the concentration of ethylene in the solvent medium than the cobalt molybdate-alumina catalysts. The yields of solid polyethylenes were good and specific viscosities were good at reaction temperatures not in excess of about 250° C.

In run 61, after each period of operation, except as otherwise indicated, the catalyst was leached of accumulated polymer by circulating the solvent medium therethrough and was then reconditioned by hydrogen treatment. Pelleted catalyst of 6-14 mesh was employed. When the catalyst was removed from the reactor at the end of the life test, there was no evidence of catalyst disintegration. Approximately one gram of solid polyethylene was produced per gram of catalyst during the life test and the polyethylenes were tough and flexible.

The polymers produced by the process of this invention can be subjected to such after-treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc. to even a wider extent than polyethylenes made by prior processes.

The polymers produced by the process of the present invention, especially the polymers having high specific viscosities in excess of about 100,000, can be blended with the conventional lower molecular weight polyethylenes to impart stiffness or flexibility or other desired properties thereto.

The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and 1 per cent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about ten liters of xylenes at a temperature close to the boiling point produced an extremely viscous solution.

The polymers produced by the present process can be subjected to chemical modifying treatments, such as halogenation, halogenation followed by dehalogenation, sulfonation, and other reactions to which hydrocarbons may be subjected.

Having thus described my invention, what I claim is:

1. A process for producing a solid polymer which comprises contacting a normally gaseous olefin selected from the class consisting of ethylene, propylene and mixtures of ethylene and propylene with an activated catalyst at a suitable polymerization temperature between about 75° C. and about 325° C. and recovering a solid polymer thus produced, said catalyst, before activation, comprising essentially at least one weight percent each of a hexavalent molybdenum oxygen compound and an activated adsorptive gamma alumina, activation of said catalyst before use thereof in polymerization being effected by partially reducing said hexavalent molybdenum oxygen compound when present on said alumina by treatment with a reducing gas at a temperature of at least about 300° C. and for a period of time sufficient to effect substantial activation of said catalyst.

2. The process of claim 1 wherein said hexavalent molybdenum oxygen compound is molybdenum trioxide.

3. The process of claim 1 wherein said catalyst comprises molybdenum trioxide and an activated gamma alumina in a weight ratio within the range of 1:20 to 1:1.

4. The process of claim 1 wherein said hexavalent molybdenum oxygen compound is cobalt molybdate.

5. The process of claim 1 wherein said reducing gas is selected from the group consisting of hydrogen, carbon monoxide, mixtures of hydrogen and carbon monoxide, and sulfur dioxide.

6. The process of claim 1 wherein said gaseous olefin is ethylene.

7. The process of claim 1 wherein said gaseous olefin is propylene.

8. The process of claim 1 wherein said gaseous olefin is a mixture of ethylene and propylene.

9. The process of claim 1 wherein said polymerization temperature is between about 200° C. and about 250° C. and the pressure of ethylene is at least about 500 p. s. i. g.

10. A process for producing a solid polymer which comprises contacting ethylene with an activated catalyst at a suitable polymerization temperature between about 75° C. and about 325° C. and recovering a solid polymer thus produced, said catalyst, before activation, comprising essentially a minor proportion of molybdenum trioxide supported upon a major proportion of gamma-alumina, activation of said catalyst before use thereof in polymerization being effected by partially reducing said molybdenum trioxide when present on said alumina by treatment with hydrogen at a temperature of at least about 300° C. and for a period of time sufficient to effect substantial activation of said catalyst.

11. A process for producing a solid polymer which comprises contacting ethylene in the presence of a liquid hydrocarbon reaction medium with an activated catalyst at a suitable polymerization temperature between about 75° C. and about 325° C. and recovering a solid polymer thus produced, said catalyst, before activation, comprising essentially at least one weight percent each of a hexavalent molybdenum oxygen compound and an activated adsorptive gamma alumina, activation of said catalyst before use thereof in polymerization being effected by partially reducing said hexavalent molybdenum oxygen compound when present on said alumina by treatment with a reducing gas at a temperature of at least about 300° C. and for a period of time sufficient to effect substantial activation of said catalyst.

12. The process of claim 11 wherein said reaction medium is a liquid aromatic hydrocarbon.

13. The process of claim 11 wherein said reaction medium is a liquid saturated hydrocarbon.

14. A process for producing a solid polymer which comprises contacting ethylene with an activated catalyst in the presence of a liquid monocyclic aromatic hydrocarbon reaction medium at a suitable polymerization temperature between about 130° C. and about 260° C. under an ethylene pressure of at least about 500 p. s. i. and recovering a solid polymer thus produced, said catalyst, before activation, comprising essentially molybdenum trioxide and gamma-alumina in a weight ratio between about 1:20 and about 1:1, activation of said catalyst before use thereof in polymerization being effected by partially reducing said molybdenum trioxide when present on said alumina by treatment with hydrogen at a temperature of at least about 300° C. and for a period of time sufficient to effect substantial activation of said catalyst.

15. The process of claim 14 wherein said monocyclic aromatic hydrocarbon is benzene.

16. The process of claim 14 wherein said monocyclic aromatic hydrocarbon is toluene.

17. The process of claim 14 wherein said monocyclic aromatic hydrocarbon is a xylene.

18. The method of producing normally solid polymers which comprises absorbing ethylene in a liquid hydrocarbon reaction medium under pressure to form a solution in which the ethylene concentration is between about 2 and about 10 percent by weight, contacting said solution with an activated catalyst at a suitable polymerization temperature beween about 130° C. and about 260° C. under a pressure in the range of about 200 to about 2000 p. s. i. g., removing hydrocarbon reaction medium containing dissolved polymer from the catalyst and separating said polymer from said reaction medium, said catalyst, before activation, comprising essentially molybdenum trioxide and gamma-alumina in a weight ratio between about 1:20 and about 1:1, activation of said catalyst before use thereof in polymerization being effected by partially reducing said molybdenum trioxide when present on said alumina by treatment with a reducing gas at a temperature between about 300° C. and about 650° C. and for a period of time sufficient to effect substantial activation of said catalyst.

19. A process for producing a solid polymer which comprises contacting ethylene with an activated catalyst which, before activation, comprises essentially a minor proportion of molybdenum trioxide supported upon a major proportion of gamma-alumina, said molybdenum trioxide being activated when present on said alumina before use in polymerization by partial reduction with a reducing gas at a temperature of at least about 300° C., effecting contacting of ethylene with said activated catalyst at a suitable polymerization temperature between about 75° C. and about 325° C., continuing the polymerization of ethylene until the polymerization activity of the catalyst has decreased substantially, thereafter discontinuing contacting of ethylene with said catalyst, separating solid polymers adsorbed by said catalyst by solvent extraction, reactivating said catalyst by partial reduction with a reducing gas at a temperature of at least about 300° C., and thereafter contacting the reactivated catalyst with a further quantity of ethylene under polymerization conditions.

20. The method of producing high molecular weight, normally solid hydrocarbons from ethylene, which method comprises incorporating ethylene in a liquid solvent-reaction medium, contacting said medium containing absorbed ethylene with an activated catalyst which, before activation, comprises essentially at least one weight percent each of a hexavalent molybdenum oxygen compound and an activated adsorptive gamma alumina, activation of said catalyst before use thereof in polymerization being effected by partially reducing said hexavalent molybdenum oxygen compound when present on said alumina by treatment with a reducing gas at a temperature of at least about 300° C. for a period of time sufficient to effect substantial activation of said catalyst, effecting said contacting at a suitable polymerization temperature between about 75° C. and about 325° C. for a period of time sufficient to effect at least partial coating of said activated catalyst with high molecular weight, normally solid hydrocarbon product, periodically removing at least a part of said coating from said catalyst by extraction with a solvent, withdrawing said liquid solvent-reaction medium containing polymerization products from contact with said catalyst, thereafter cooling said liquid solvent-reaction medium to effect solidification of high-molecular-weight polymers, separating solidified high-molecular-weight products and subsequently separating low-molecular-weight products from said solvent; increasing the polymerizing activity of the catalyst after removal of said coating by repeating the aforesaid activation of said catalyst and effecting further polymerization of ethylene by contact with said catalyst.

21. The process of claim 1 wherein said contacting is effected in the presence of a liquid hydrocarbon reaction medium.

22. The process of claim 14 wherein said treatment with hydrogen is effected at a temperature between about 300° C. and about 650° C.

References Cited in the file of this patent

UNITED STATES PATENTS

| Number | Name | Date |
| --- | --- | --- |
| 2,153,553 | Fawcett | Apr. 11, 1939 |
| 2,259,961 | Myddleton | Oct. 21, 1941 |
| 2,393,288 | Byrns | Jan. 22, 1946 |
| 2,487,564 | Layng | Nov. 8, 1949 |
| 2,572,300 | Arnold et al. | Oct. 23, 1951 |
| 2,634,260 | Carnahan | Apr. 7, 1953 |